United States Patent [19]
Landy

[11] Patent Number: 5,188,644
[45] Date of Patent: Feb. 23, 1993

[54] FILTER, BAG AND METHOD

[76] Inventor: Keith Landy, #225, 6175 NW. 153rd St., Miami Lakes, Fla. 33014

[21] Appl. No.: 799,037

[22] Filed: Nov. 27, 1991

Related U.S. Application Data

[63] Continuation-in-part of Ser. No. 593,851, Oct. 5, 1990, Pat. No. 5,120,331, which is a continuation-in-part of Ser. No. 474,989, Feb. 6, 1990, abandoned.

[51] Int. Cl.$^5$ .................. B01D 46/02; B01D 53/04
[52] U.S. Cl. ........................................... 55/17; 55/74; 55/97; 55/333; 55/337; 55/471; 55/473; 55/520
[58] Field of Search ................. 55/97, 332–337, 55/471–473, 498, 520, 1, 17, 74

[56] References Cited

U.S. PATENT DOCUMENTS

| | | | |
|---|---|---|---|
| 1,639,133 | 8/1927 | Greene | 55/498 |
| 1,693,958 | 12/1928 | Patten | 55/520 X |
| 2,243,637 | 5/1941 | Landis et al. | 55/471 X |
| 2,322,548 | 6/1943 | Sigmund | 55/520 X |
| 2,936,855 | 5/1960 | Allen et al. | 55/498 |
| 2,968,361 | 1/1961 | Buckman | 55/498 X |
| 3,308,610 | 3/1967 | Springer et al. | 55/471 |
| 3,563,004 | 2/1971 | Schouw | 55/472 X |
| 3,799,354 | 3/1974 | Buckman et al. | 55/498 X |
| 4,310,419 | 1/1982 | Nara et al. | 55/520 X |
| 4,452,619 | 6/1984 | Wright et al. | 55/498 X |
| 4,629,482 | 12/1986 | Davis | 55/471 X |
| 4,732,678 | 3/1988 | Humbert, Jr. | 55/498 X |
| 4,900,346 | 2/1990 | Lutz | 55/471 X |
| 4,954,255 | 9/1990 | Müller et al. | 55/498 X |

*Primary Examiner*—Robert Spitzer
*Attorney, Agent, or Firm*—Jack E. Dominik

[57] ABSTRACT

A comprehensive particulate filtering unit in which the filter includes bag like elements secured to infuser members which surround a blower and motor, designed to operate and be used as a compact portable unit.

23 Claims, 5 Drawing Sheets

FILTER, BAG AND METHOD

CROSS-REFERENCE TO RELATED APPLICATION

This application is a continuation-in-part of application Ser. No. 593,851 filed Oct. 5, 1990 by the same inventor herein and entitled "Composite Gas Filtering Unit" now U.S. Pat. No. 5,120,331, which in turn is a continuation-in-part of application Ser. No. 474,989 filed Feb. 6, 1990 by the same inventor herein and entitled "Composite Gas Filtering Unit", now abandoned.

FIELD OF THE INVENTION

The present invention relates in general to an air filtering unit as well as a method for removing contaminants from the air. Specifically the invention relates to a filtering unit and its filter cartridge and a method that is effective and efficient in the filtration of a wide range of particle sizes in a unitized structure that uses an efficient and direct transfer of air from the impeller into the singular filter module. Further, the air handling system is an integral part of the filtering module and adds to the efficiency of the filtration process and the filtering module is an integral part of the air handling system and adds to the efficient use of electric power.

SUMMARY OF THE PRIOR ART

Particulate contaminants are usually removed from air by three principal types of mechanisms: mechanical devices, electrostatic precipitators and media filtration. The appropriate use for each mechanism is, in general, based on the particle size, the quantity of particulates to be removed and the percentage of particles that are required to be removed.

Normally, mechanical devices are most frequently used for the larger sized particles, usually greater than 10 microns in diameter and where a large volume of particulate matter is to be removed. With mechanical devices, in general, the efficiency of removal for particles 5 to 20 microns in size is about 50 to 80 per cent but increases to 80 to 95 per cent for 15 to 50 micron particles. With mechanical devices static pressure does not substantially increase as the system loads with the captured particulate material. The resulting low energy cost is the primary advantage of mechanical devices Because electrostatic filters require sophisticated maintenance and also generate ozone, they are not practical in a portable filtration system designed to return filtered air to the room.

Media filtration is highly effective in removing both large and small particles. Not only can the large particles be removed but particles of less than 1 micron in diameter can be removed with an efficiency up to 99.99 percent. The main disadvantage of media filters is that as the filter loads with particles, the pressure required to move the air through the system increases, with a concomitant increase in the energy requirement.

Most portable filtration units use media filtration to remove both large and small particles. In general, these systems contain a blower and filter enclosed in the same housing. They usually return the filtered air back into the room and operate independent of the buildings ventilation system.

Many industrial processes, such as welding and grinding, generate harmful airborne particulates. The ventilation system of most buildings is not designed to remove these additional particles in a safe and efficient manner; therefore, it is generally recommended that these operations be performed in areas of the building where hoods or canopies can be installed to capture and duct these airborne particulates to a removal system. A problem arises when maintenance welding and or grinding must be done in a location where a canopy and exhaust system can not be located for physical or economic reasons. One method to solve this problem is to use a capture-at-the-source portable air filtration unit. These self contained units trap and filter the airborne particulate material, returning clean air back into the work area. Portable source capture filtration units, in addition to allowing work to be done in areas where the building ventilation system is not adequate, save energy by not exhausting conditioned air from the workspace.

Currently available portable source capture air filtration units use the same type of filters and blower motor components designed for permanent building ventilation systems. Buildings are designed with dedicated space to use these components properly, but adequate space is not available in a compact portable source capture systems, as discussed below.

Building ventilation systems may utilize a blower wheel enclosed in a scroll housing designed to direct and push the air through long duct runs. Scroll blower housings gather and direct this air through a small defined discharge area of the blower housing, which usually is about the same diameter as the duct. The air is forced out of the blower housing under the high velocity needed to deliver the air throughout a building's duct system. A major problem of incorporating a scroll blower housing in a portable source capture unit is that it doesn't have any space for a straight duct run at the discharge end of the blower housing. The air from the blower wheel is thus not allowed to smooth out and become non-turbulent. The straight duct length required is a minimum of two times the diameter of the blower wheel; without this the blower discharges turbulent air causing the system to run inefficiently with an increase in both noise level and static resistance.

Most ventilation systems use dry media filters which expose a large surface area of filter medium to the air stream. The filter medium is contained in a rigid frame, allowing the filter to be sealed within a flow-through housing. Long smooth transitions are used in building ventilation systems to keep the airflow non-turbulent, both as it enters and leaves the filter bank. The major problem with portable source capture air filtration systems is, in order to make the unit as small as possible, there is no room for these transitions to and from the filter. Source capture systems discharge air from the scroll blower housing directly at the filter surface. To overcome resistance caused by this inefficient placement, more energy must be used to achieve the desired airflow rates.

Pre-filters and final filters used in both portable source capture air filtration systems and building ventilation systems expose essentially a flat surface to the rapidly flowing airstream. This flat surface accounts for a large part of the static resistance present even with a new filter.

Some portable source capture air filtration units use vacuum cleaner motor blowers which, while capable of overcoming high static pressures, are not effective in providing the volume of air needed in all but the smallest portable capture canopy. In addition, vacuum cleaner motors are loud; use brushes that spark and need frequent changing; and have high electrical consumption requirements. They often overload electrical outlets, especially when used in conjunction with other electric maintenance equipment, such as the welders that are commonly used.

The size of airborne particles found in welding and grinding operations range from sub-micron aerosols of welding fume to particles large enough to be easily seen. Rigid frame media filters are usually manufactured from one type of medium designed to remove only a selected range of particle sizes. Filters designed to remove and hold large particles are not efficient at removing sub-micron particles or aerosols. A filter designed to remove sub-micron aerosols can also remove large particles but these larger particles will rapidly load the filter, markedly shortening its life. To solve the problem of removing a wide range of particle sizes from one airstream, it is common to use two or more filters in series. The first functions as a high capacity prefilter designed to capture the larger sized particles. The prefilter extends the life and protects the final filter which removes the smaller and sub-micron particles. Based on the contaminant load, the prefilter and the final filter are selected to obtain the degree of cleanliness required to return the air to the work space.

Dry media prefilters and dry media final filters are made from a variety of materials. The prefilters are usually flat sheets of rough spun glass, open cell foams, expanded metal or screens. Final filters are usually extended surface area or pleated glass fibers, wet-laid cellulose paper or ultra-fine glass fiber paper commonly called HEPA's. The loading characteristics of both prefilters and final filters are similar: as the media collects particles from the air flowing through the filter, the resistance to the airflow increases. Portable source capture systems currently used for welding require a very efficient final filter to remove the submicron sized welding fume and also require frequent changing of the prefilter to handle the tremendous amount of dirt and debris associated with welding. Currently available portable systems require the user to frequently check and clean or change the prefilter. This usually is not done and the airflow through the unit may become obstructed. To avoid the nuisance of changing the prefilter, it is not uncommon for the user to simply remove it, substantially shortening the life of the final filter.

SUMMARY OF THE INVENTION

The present invention is directed to a comprehensive particulate filtering unit in which the filter includes bag like elements secured to infuser members which surround a blower and motor, designed to operate and be used as a compact portable unit without a pre-filter More specifically, the present invention includes using rectangular sheets to form flexible, coilable, permeable bag like filter medium elements which are attached at equally spaced intervals to nonpermeable rigid and smooth airflow infuser wings. The infuser wings, with the bags of attached filter fabric, are circularly aligned and incorporate a central open area that houses the air moving impeller wheel. The wings are spaced apart to provide airflow channels for the direct infusion of the particulate laden air from the impeller wheel into the air filtering bags. The bags are formed by using sheets of filtering material folded back upon itself and attached to the infuser wings. When the edges of the filter fabric are sealed, multiple filtering bags are formed around the central manifold. The central manifold is defined by the inner edges of the infuser wings which in turn define the outer portion of the central open area. Spacers are employed inside the filtering bags between the inside adjacent layers of filtering fabric to physically separate same and support the air flow bags in the correct spatial relationship. Spacers are also employed on the outside of the filtering bags between outside adjacent layers of the filtering fabric. These outside spacers physically separate and help maintain the structure of the filtering bags. They also provide an air flow channel for the air leaving the filtering bags. The filtering bags, with both the inside and outside spacers, are wound around the central manifold forming curved filtering bags. In addition to separating the layers inside the filtering bags, the inside spacers are placed to maximize the capture of particles by settling and inertial impaction. This serves the same function as a prefilter, but differing by not having to be changed. This is because, as the spacers load and trap more particles, the static resistance of the unit does not increase since the air is not dependent on passing through a membrane pre-filter. Spacers located both inside and outside of the bag can also be made from adsorptive, absorptive, chemisorbtive or reactive agents to remove gases and odors. An additional sheet of particulate filtering material is optionally employed around the assembly of wound bag filters as a final filter and protective wrap. It allows for ease in handling and also enhances the appearance of this package. The complete filter cartridge comprised of the airflow infuser wings, the filtering media bags, both types of spacers and the final particulate wrap are potted into opposed end caps. This seals the edges of the filtering fabric from which the bags are formed. In addition, potting provides structural and pneumatic integrity to the filter cartridge. The method of the invention relates to filtering ambient air by utilizing a blower in the housing in which a plurality of infuser wings having a curvilinear face are spaced to conform the air discharged from the blower into curvilinear spiral-like paths. Thereafter, the method contemplates encapsulating the end portions of the infuser wings with pairs of filtering material closed on both edges and end portion to define a bag; and positioning spacers variously to optionally space the exterior and interior portions of the bags.

OBJECTS OF THE INVENTION

In view of the foregoing, it is an object of the present invention to provide a particle filtration unit and method of filtering particles that utilize a combination of particle filtration practices and theories in a singular structure.

Another object of the present invention is to provide a particle filtering unit that can remove a wide range of particle sizes in a singular structure.

Another object of the present invention is to provide a singular particle filtering unit that contains a very efficient final filter with its own built in spacers which function as prefilters and where these spacers do not substantially increase the pressure drop of the system as they load and protect the final filter and preclude monitoring or changing of prefilters.

Another object of the present invention is the efficient use of a blower wheel without a scroll housing where the blower wheel aids in the filtration process and where the airflow infuser wings of the filter aid in the efficient flow of air from the blower into the filter.

Another object of the present invention is the efficient use of a portable filtering device in which the blower and the filter are an integrated and matched system, eliminating the need for air flow plenums or transition structures. Placement of all filtering and air handling components are calculated, thus minimizing static pressure losses and allowing the device to be highly energy efficient.

Another object of the present invention is the placement of the filtering structure around the blower and motor to effectively muffle blower and motor noise and provide a compact and lightweight design without adversely effecting its efficiency.

A further, but not final object, is the provision of a particle filtration unit that contains a minimum of components, several of which have multiple functions, and a device that is easily maintained in various environments by both skilled and unskilled personnel.

A further object, is the provision of a portable unit that does not require the additional housings traditionally used to hold and seal a blower and multiple filters. Typical units weigh between 15 and 35 pounds, and thus can be easily carried by one person.

Another object of the present invention is to provide a singular filtering unit in which the bags, spacers, and end wrap can easily be constructed from a variety of materials depending on the nature of the contaminant. The bags, spacers, and end wrap can also be manufactured from materials that remove odors and gases, as well as particles.

A further object, is the provision of a portable unit that does not require the additional housings traditionally used to hold and seal a blower and multiple filters, thus eliminating sources of air leakage.

BRIEF DESCRIPTION OF THE DRAWINGS

Further objects and advantages of the present invention will be readily understood as the following description proceeds, taken in conjunction with the following drawings, in which.

DESCRIPTION OF PREFERRED EMBODIMENTS

In broad outline, the illustrative embodiment of various phases of the invention include a plurality of bags surrounding an air handling impeller wheel that can operate efficiently without being placed in a scroll housing, e. g., backward inclined, which is positioned in a central core. Infuser wings in terms of their length, curvature and alignment are matched to the impeller wheel to assure that controlled air enters the bag filters.

The particulate laden air is drawn into the filtering unit by negative pressure. To minimize the generation of static resistance the principal directional change of the air stream occurs at the impeller wheel. The air is turned and pushed out by the impeller wheel under positive pressure into the manifold which, in this invention, comprises the airflow infuser wings. These efficiently direct and curve the air into the air filtering bags with minimal loss of pressure.

The largest particles thrown out by the impeller wheel do not turn with the curved flow of air. Instead they hit the airflow infuser wings, falling and settling to the bottom of the filter where they are trapped by the spacers specially angled and located at the bottom of the bags. This action is similar to a mechanical filtering gravitational settling chamber and acts as a prefilter for very large particles.

Many large particles turn with the airstream through the airflow infuser wings and impact on the wall of the filter bag in the pathway of the curving air stream. This action is similar to a mechanical filtering centrifugal separator and also functions as a prefilter for these large particles.

Both of these methods of mechanical filtration are utilized due to the central placement of the impeller wheel. The air continues to follow its spiral path as it flows through the bags and around the spacers. Medium and large sized particles can not negotiate the continually turning path that the air makes. The momentum of each particle will determine its path and whether it will impact into the filtering spacers or the walls of the filter bag. This type of inertial impaction along with the settling chamber effect and centrifugal separation action serve the function of a prefilter but have the distinct advantage of not having to be changed or monitored.

Thus, filtration practices are utilized which remove the majority of medium, large, and very large particles without increasing the pressure drop of the filter as it loads. The air which now contains smaller particles travels through the remaining area of the bag filters. In practice, the proximal portion of the bag filters with its spacers load with the larger particles, while the remaining distal portions remove the smaller particles.

Figure 1:
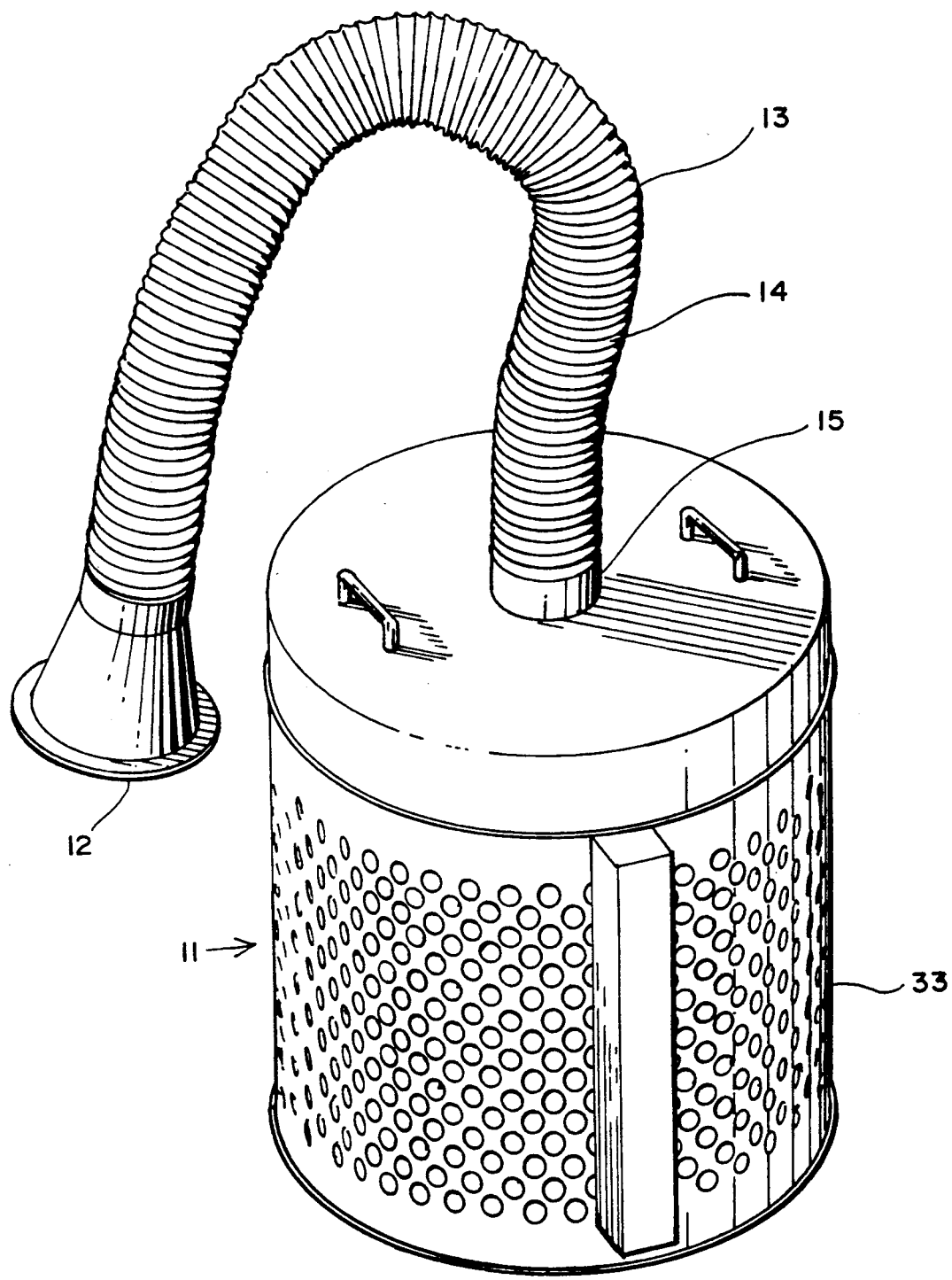
FIG. 1 is a perspective view of the filtering unit, illustrating the outer casing, and a capture canopy.
Figure 2:
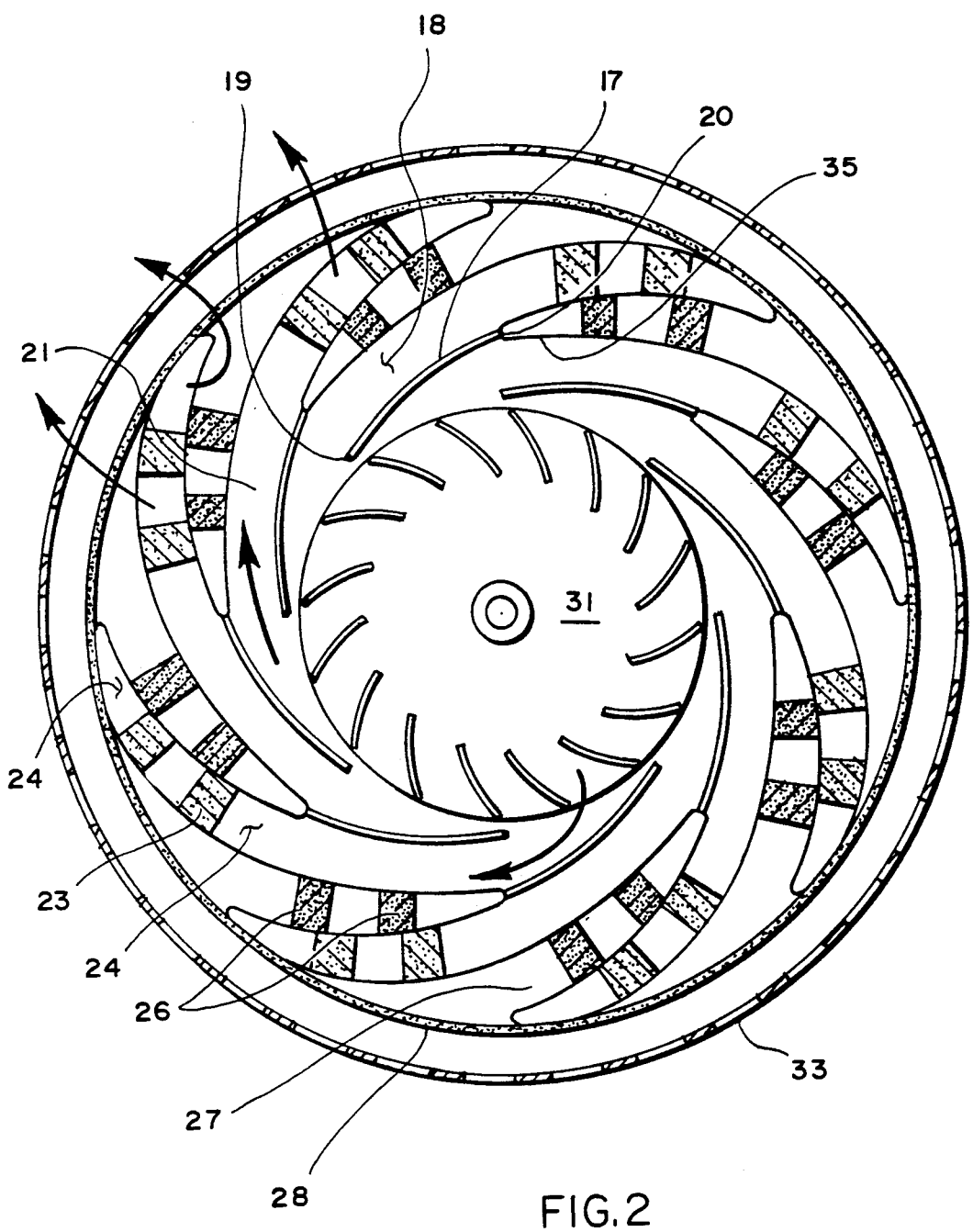
FIG. 2 is a transverse sectional view of the unit taken across the center of the unit of FIG. 1 but in enlarged scale.
Figure 3:
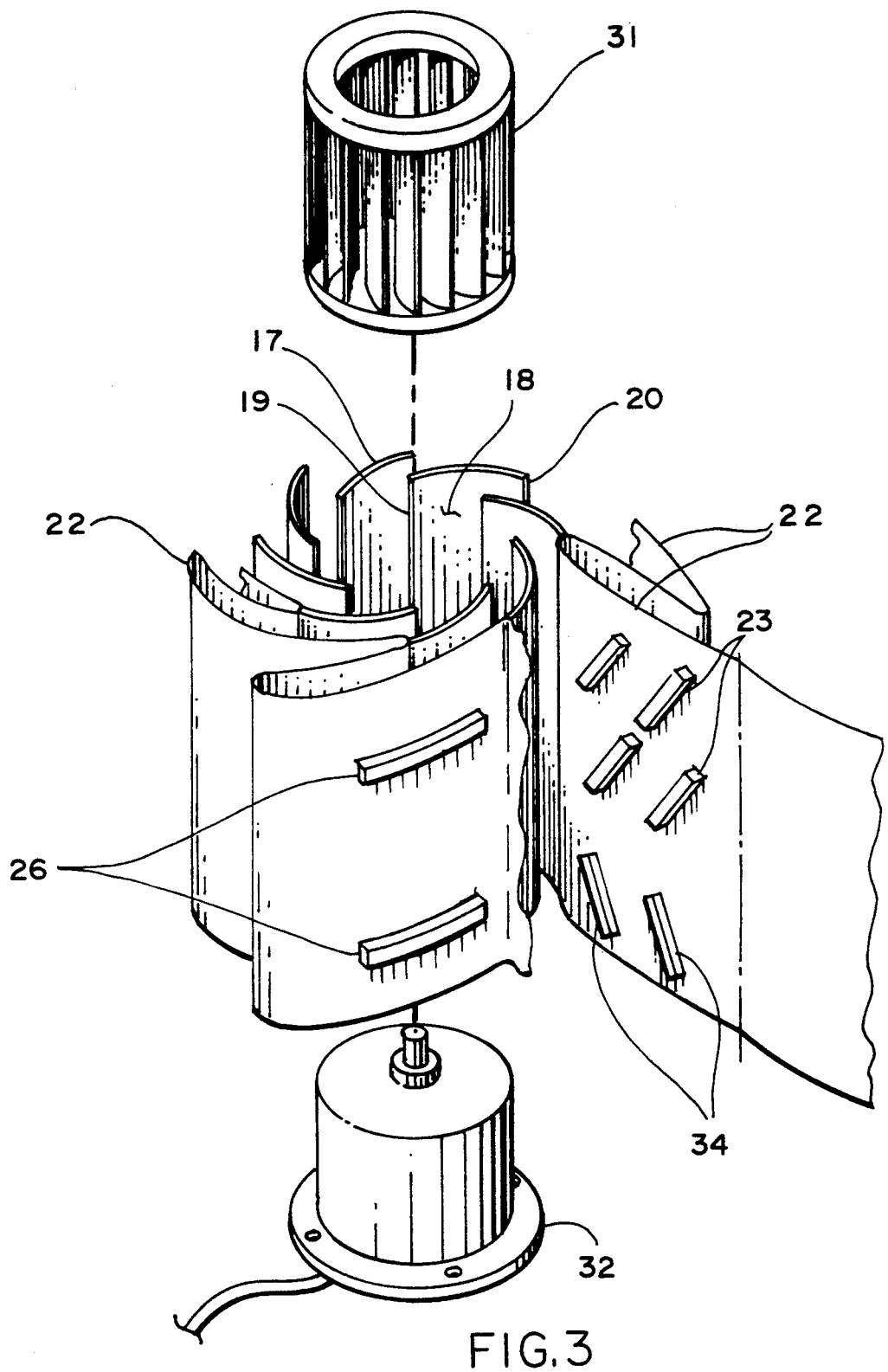
FIG. 3 is an exploded isometric view of the central manifold structure, motor and blower, illustrating the view of a final filtering media without the end caps and with the outside spacers and inside spacers attached.
Figure 4:
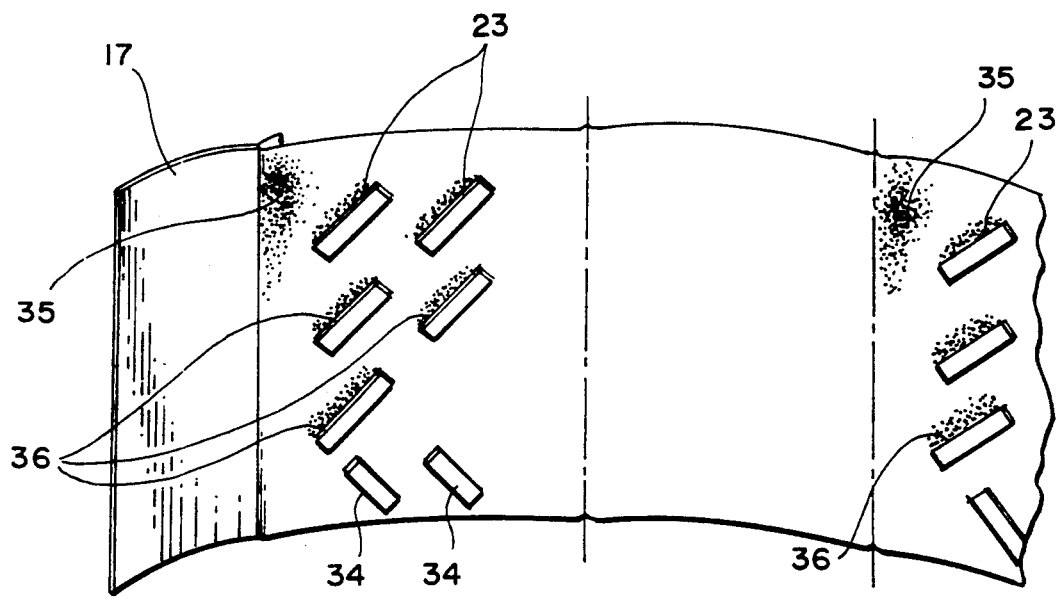
FIG. 4 is the unfolded view of part of the final filtering fabric material attached to an airflow infuser wing and showing placement of the inside spacers.
Figure 5:
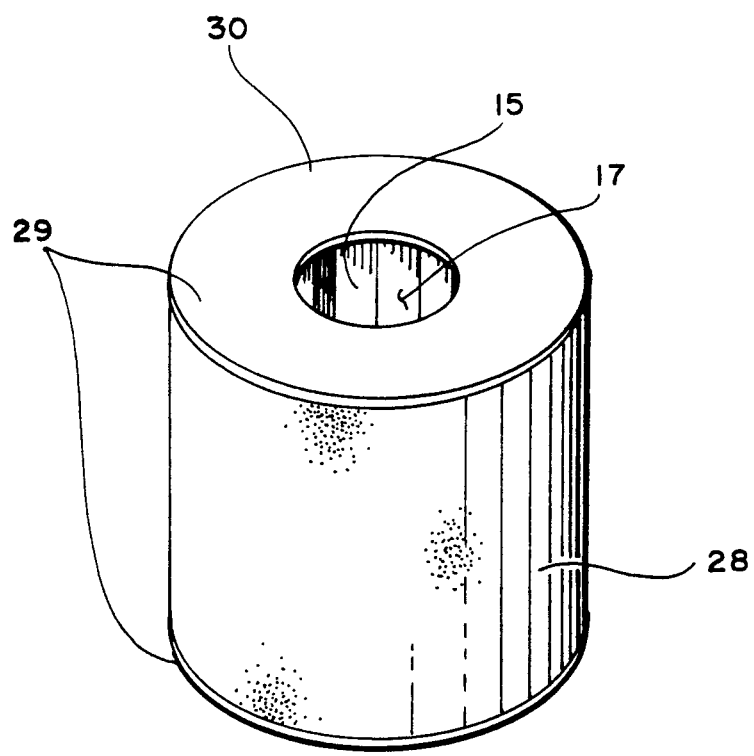
FIG. 5 is a perspective view of a composite filter cartridge.

More specifically, the preferred embodiments of the present invention are best understood by referring to FIGS. 1-7 of the drawings, like numerals being used for like and corresponding parts of the various drawings. FIG. 1 is a complete portable source capture air filtration unit 11. A fume/particulate capture canopy 12 is supported by an adjustable flexible air duct 13. A metal goose-neck microphone stand is placed inside an equal length of air hose 14 forming the air duct 13 which connects the fume/particulate capture canopy 12 of the unit 11.

A plurality of airflow infuser wings 17 are employed to form a central manifold structure 18. These wings 17 are nonpermeable, and typically formed from a smooth plastic material such as polypropylene. The infuser wings 17 have a slight curvature. For details of formulae for generating the curvature of the infuser wings, see patent application Ser. No. 593,851. The inside lengthwise edge 19 of each infuser wing 17 is aligned at a substantially equidistant intervals around the inside of the central manifold 18. The outside lengthwise edge 20 of each infuser wing 17 is aligned so as to form a circle with a larger diameter then the interior circle, thus forming the outside of the central manifold structure 18. The central manifold structure 18 is the start of the airflow channels 21 which lead into the filter bags 24. The filter bags 24 are attached to the central manifold structure 18 at the outside lengthwise edge 20 of the airflow infuser wing 17. The infuser wings 17 are equally vertically spaced and attached with staples or hot melt glue to the sheet of particle filtering media 22.

The length of filtering media 22 spaced between the airflow infuser wings 17 determines the length of the filtering bags 24. The filter bag 24 is formed as the filter media is folded back and attaches to the next outside edge 20 of the airflow infuser wing 17. The dimensions of the filtering media 22 may vary considerably according to: the nature and concentration of the particulates; the volumes of air to filtered; and the quantity and configuration of the filtering spacers 23. The particle filtering medium 22 is typically easily coilable, flexible and gas permeable. One example is ⅛ to ¼ inch thick fiberglass filter medium; however, filters have been made from HEPA filter medium, blown synthetic microfiber medium, or carbon impregnated fabric. Any filter medium or combination thereof found in pleated box filters or flexible bag filters can be used.

Inside spacers 23 are employed to physically separate the inside adjacent layers of the filtering bags 24 allowing air to continue on the path initiated by the airflow infuser wings 17. Outside spacers 26 are used to physically separate the outside adjacent layers of the filtering bags 24. Both inside and outside spacers can also be gas filtering by utilizing various combinations of adsorptive, absorptive, chemisorptive or reactive agents. The complete filter comprised of filter bags 24 with attached spacers 23 and 26 are spirally wound around the central manifold structure 18. The filter bags are wound around the central manifold structure 18 to keep the assembly compact. An additional sheet of filtering material is utilized as a filter protective wrap 28 around the outside of the assembly of wound filter bags 24. This protective wrap 28 is typically a prefilter material with a scrim or screen affixed to its outer layer.

The complete filter comprising the plurality of airflow infuser wings 17, the bag filters 24 with the corresponding spacers 23 and 26 and the filter protective wrap 28 are potted into end caps 29. The end caps are nonpermeable and solid and may be formed by an appropriate sealing or potting material such as a hot melt glue or an epoxy. The structural integrity of the filter cartridge is now insured with the fixed placement of the airflow infuser wings 17. Further, the end caps 29 seal the top and bottom edges of the filter media 22 forming and sealing the bag filters 24 and preventing unfiltered air from leaking out of the cartridge.

A backward inclined impeller wheel 31 is situated in the center core surrounded by the central manifold structure 18. The impeller wheel 31 is attached to a motor 32 which is typically located in the center core below the impeller wheel 31. The impeller wheel 31 and the motor 32 are secured to the base of the outer structural housing 33.

The impeller wheel 31 directs the particulate laden air at the central manifold structure 18. The airflow infuser wings 17 of the central manifold structure 18 are formed to the optimal curve that most efficiently collects, turns and discharges smooth air into the wound around filtering bags 24. The filtering bags 24 are wound in order to keep the filter cartridge compact and allow for centrifugal filtering actions to take place. Large particles hit the airflow infuser wings 17 and fall to the bottom of the filter bag 24 where they are trapped by the inside spacers 34 located at the bottom of the bags. These are typically a cut strip of polyester prefilter material hot melt glued to the filter media 22 at the proper angle. Additional large particles are impacted into the filtering medium 22, primarily at the centrifugal impaction zone 35. Particles are impacted into the other spacers 23 primarily at the inertial impaction zone 36. These other inside spacers are of the same material and also hot melt glued to the filtering media 22 at the proper angle and alignment.

Figure 6:
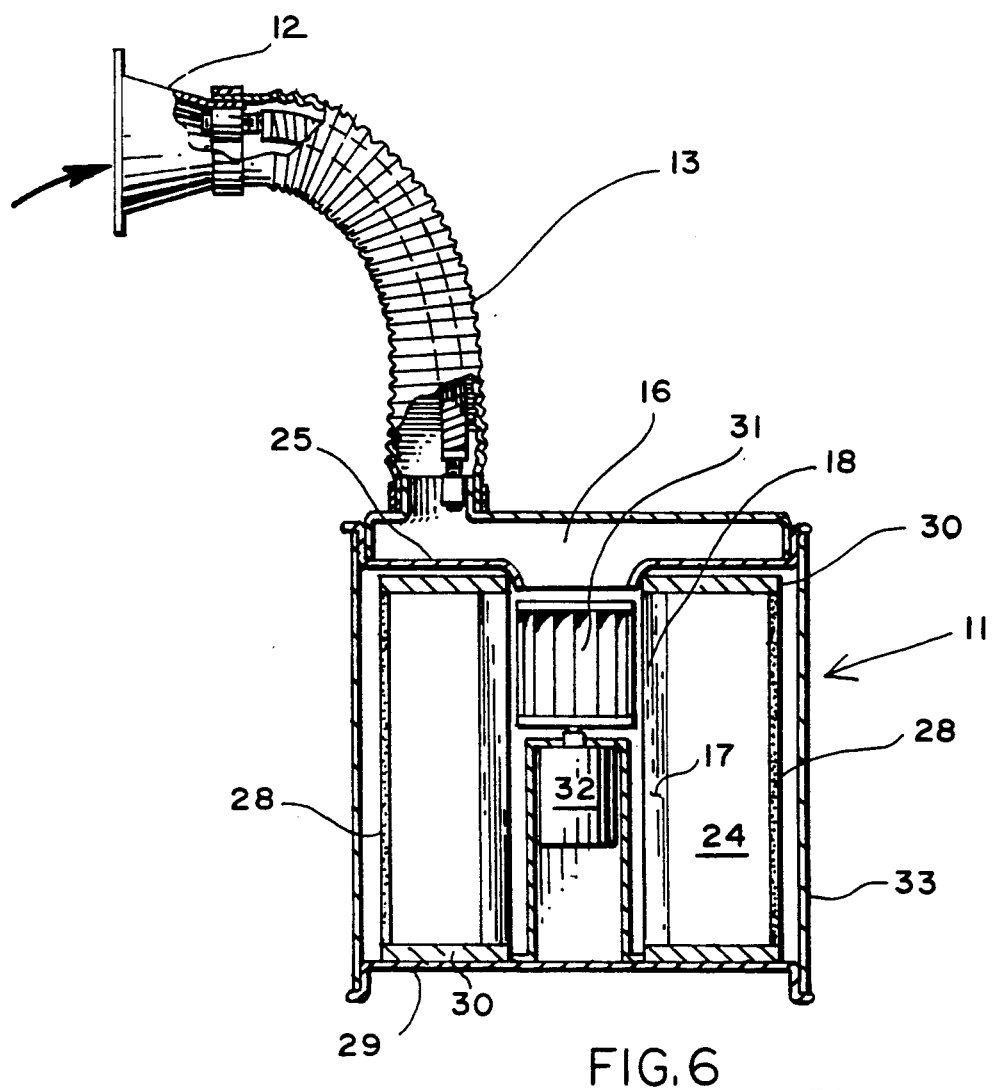
FIG. 6 is a showing of an alternative embodiment illustrating the use of an off-center air intake forming a spark arrester.
Figure 7:
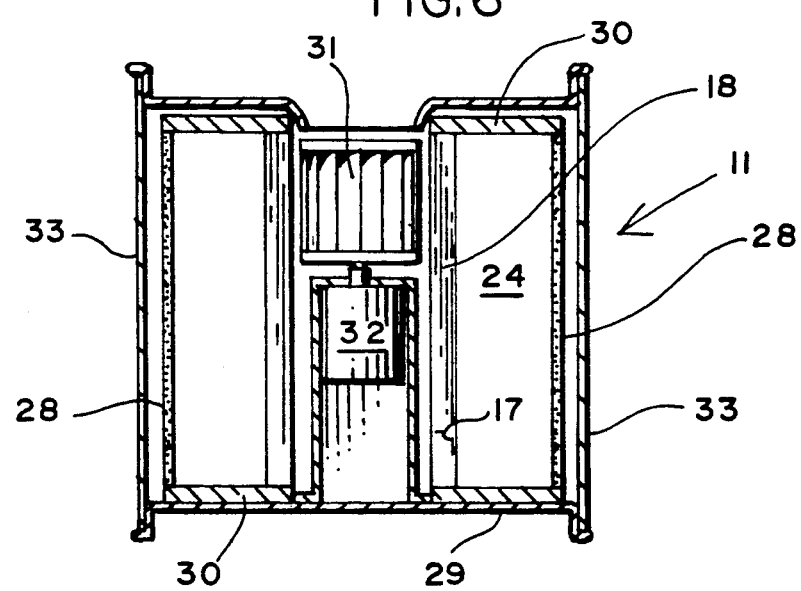
FIG. 7 is taken from the same section as FIG. 6 but without the spark arrester.

In the embodiment shown in FIG. 6, it will be seen that the canopy 12 receives air which goes into an upper plenum chamber 16 and impacts on a spark arrester 25 and thereafter rolls over the air intake 15 into the impeller wheel 31 as driven by the motor 32. The air thereafter passes through the infuser wings 17 and filter cartridge as previously described.

METHOD

The method of the invention relates to filtering particulates from ambient air by utilizing a blower in the housing in which a plurality of infuser wings having a curvilinear face are spaced to conform the air discharged from the blower into curvilinear spiral-like paths. Thereafter, the method contemplates encapsulating the end portions of the infuser wings with pairs of filtering material closed on both edges and end portion to define a bag; and positioning spacers variously to optionally space the exterior and interior portions of the bags.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and appended claims.

What is claimed is:

1. The method of filtering particulates from ambient air by utilizing a blower and a housing and means for powering the blower to convert the ambient air into blown ambient air, comprising the steps of:
    blowing ambient air into a plurality of infuser wings positioned to encircle the blower having edges and ends for forming the discharging from the blower into curvilinear spiral like paths and impacting large particles which lose their momentum and fall thereby achieving a pre-filter effect,
    encapsulating the edge portions of the infuser wings with adjacent pairs of filtering material closed on both edges and at the end portion defining a bag thereof for receiving said blown ambient air and further filtering the same,
    and positioning spacers outside and inside of the bag to separate all walls from each other.

2. In the method of claim 1 above,
    curving the bag to create a zone of centrifugal impaction for producing a prefilter effect.

3. In the method of claim 1 above,
    positioning angled spacers inside of the bag thereby inducing additional impaction of the air passing therethrough thereby achieving a prefilter effect.

4. In the method of claim 1 above,
    positioning settling spacers at the lower portion of the entrance to the bag angled to trap larger particles which lose their momentum upon impacting the infuser wings and drop down from the flow of air and adding to the prefilter effect.

5. A filtering unit comprising, in combination, a housing, a manifold interiorly of said housing, blower means communicating with the interior portion of said manifold for moving a fluid centrifugally outwardly, a plurality of infuser wings spaced peripherally around said manifold interior portion which are proportioned and located to generate paths of fluid being discharged from the blower means, and a plurality of bag like members communicating with adjacent pairs of said infuser wings to define a dead end filter bag for receiving the discharge from the blower and infuser wings, said filter bag like members all having a particulate and/or gas capturing content.

6. In the filter unit of claim 5 above, spacers provided outside said filter bag like members 7. In the filter unit of claim 6 above, said spacers made of one or more types of adsorptive, absorptive, chemisorptive, reactive or particulate filtering material, positioned for filtering the fluid passing through the bag like members.

8. In the filter unit of claim 5 above, spacers provided inside of said filter bag like members.

9. In the filter unit of claim 8 above, said spacers made of one or more types of adsorptive, absorptive, chemisorptive, reactive or particulate filtering material positioned for filtering the fluid passing through the bag like members.

10. In the filter unit of claim 9 above, said spacers positioned to impact particulates and function as a prefilter.

11. In the filter unit of claim 5 above, spacers provided outside said filter bag like members, and, spacers provided inside said filter bag like members.

12. In the filter unit of claim 11 above, said spacers made of one or more types of adsorptive, absorptive, chemisorptive, reactive or particulate filtering material positioned for filtering the fluid passing through the bag like members.

13. In the filter unit of claim 5 above, an outer wrap peripherally positioned proximate to the end portions of said filter bag like members for the twofold purpose of retaining the same in a uniform spiral like orientation and further filtering the fluid prior to discharge exteriorly of the housing.

14. A filter cartridge for use in a filter unit having a housing, and an impeller wheel, and means for driving the impeller wheel, said filter cartridge comprising, a pair of end members, a plurality of infuser wings secured to said end members, said infuser wings proportioned to interface with said impeller and define parallel paths for the discharge of a fluid from said impeller, bag filter elements secured to adjacent parallel outer edges of said infuser wings, and means for wrapping said bag filter elements in a spiral/cylindrical orientation surrounding the plurality of infuser wings, whereby said filter cartridge serves as a replacement interiorly of the filter unit.

15. In the filter cartridge of claim 14 above, a plurality of spacers outside of said bag filter elements to space adjacent bag filter elements from each other.

16. In the filter cartridge of claim 15 above, said spacers made of one or more types of adsorptive, absorptive, chemisorptive, reactive or particulate filtering material positioned for filtering the fluid passing through the bag filter elements.

17. In the filter cartridge of claim 14 above, spacers positioned inside of the bag filter elements to assist in the separation of the inside walls of the bag filter elements.

18. In the filter of claim 17 above, said spacers made of one or more types of adsorptive, absorptive, chemisorptive, reactive or particulate filtering material positioned for filtering the fluid passing through the bag filter elements.

19. In the filter of claim 18, said spacers positioned to impact particulates and function as a prefilter.

20. In the filter cartridge of claim 14 above, a plurality of spacers outside of said bag filter elements, to space adjacent bag filter elements from each other, a plurality of spacers positioned inside of said bag filter elements to assist in the separation of the inside walls of the bag filter elements.

21. In the filter of claim 20 above, said spacers made of one or more types of adsorptive, absorptive, chemisorptive, reactive or particulate filtering material positioned for filtering the fluid passing through the bag filter elements.

22. In the filter cartridge of claim 14 above, filter spacers placed at an angular orientation inside of the bag filter elements.

23. A filter comprising, in combination, a centrifugal type blower and power means, a plurality of infuser wings surrounding the blower, said infuser wings terminating in spaced and relationship, a bag member formed to be secured to the spaced ends of the infuser wings to receive pressure fluid air, a cylindrical housing surrounding said filter having openings therein for the discharge of pressure fluid, opposed ends for both extremes of the cylindrical housing, one such end having a false cover with an offset first opening for receiving incoming pressure fluid, a second opening immediately adjacent the blower in pneumatic communication with the first opening of the outside cover defining a spark arresting chamber, and means for activating the power means for the blower to induce pressure fluid from the outside of the filter through the spark arrester chamber and then between the infuser wings into the bag member for filtering particulates from a pressure fluid.

* * * * *